(12) United States Patent
Abbondanzio et al.

(10) Patent No.: US 9,015,325 B2
(45) Date of Patent: **\*Apr. 21, 2015**

(54) PERFORMING MAINTENANCE OPERATIONS ON CLOUD COMPUTING NODE WITHOUT REQUIRING TO STOP ALL VIRTUAL MACHINES IN THE NODE

(71) Applicant: International Business Machines Corporation, Armonk, NY (US)

(72) Inventors: Antonio Abbondanzio, Raleigh, NC (US); Rohith K. Ashok, Apex, NC (US); Roy F. Brabson, Raleigh, NC (US); Hugh E. Hockett, Raleigh, NC (US); Matt R. Hogstrom, Cary, NC (US); Edward M. Howard, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,806

(22) Filed: Apr. 8, 2013

(65) Prior Publication Data

US 2013/0232268 A1    Sep. 5, 2013

Related U.S. Application Data

(63) Continuation of application No. 13/356,371, filed on Jan. 23, 2012.

(51) Int. Cl.
*G06F 15/173*        (2006.01)
*H04L 12/911*        (2013.01)
(Continued)

(52) U.S. Cl.
CPC .............. *H04L 47/70* (2013.01); *G06F 9/4856* (2013.01); *G06F 9/5072* (2013.01)

(58) Field of Classification Search
CPC ............ G06F 11/0709; G06F 11/2023; G06F 9/4856; G06F 9/5072; H04L 47/70; H04L 12/24; H04L 41/00
USPC ................................................... 709/223, 226
See application file for complete search history.

(56) References Cited

U.S. PATENT DOCUMENTS 7,761,612 B2 *   7/2010   Corry et al. ........................ 710/8
8,010,085 B2 *   8/2011   Apte et al. ..................... 455/410
(Continued)

OTHER PUBLICATIONS

Office Action for U.S. Appl. No. 13/356,371 dated Aug. 1, 2014, pp. 1-17.

(Continued)

*Primary Examiner* — Alina N Boutah
(74) *Attorney, Agent, or Firm* — Robert A. Voigt, Jr.; Winstead, P.C.

(57) ABSTRACT

A method, system and computer program product for performing maintenance operations on a cloud computing node. An administrative server receives an indication that a maintenance operation is to be performed on a cloud computing node. The administrative server identifies which virtual machine(s) on the cloud computing node will be affected by the maintenance operation. The administrative server relocates the virtual machine(s) to be affected by the maintenance operation to other suitable cloud computing node(s) prior to the maintenance operation being performed. The administrative server then performs the maintenance operation on the cloud computing node. The virtual machine(s) may be relocated back to the cloud computing node after the maintenance operation is completed in response to a need to rebalance resources in such a manner. In this manner, maintenance operations may be performed on a cloud computing node without requiring to stop all the virtual machines in the node.

7 Claims, 7 Drawing Sheets

(51) Int. Cl.
  *G06F 9/48*   (2006.01)
  *G06F 9/50*   (2006.01)

(56) References Cited

U.S. PATENT DOCUMENTS

| | | | |
|---|---|---|---|
| 2009/0204961 A1* | 8/2009 | DeHaan et al. | 718/1 |
| 2009/0300606 A1* | 12/2009 | Miller et al. | 718/1 |
| 2010/0161922 A1* | 6/2010 | Sharp et al. | 711/162 |
| 2011/0022711 A1 | 1/2011 | Cohn | |
| 2011/0032830 A1* | 2/2011 | Merwe et al. | 370/251 |
| 2011/0179415 A1 | 7/2011 | Donnellan et al. | |
| 2011/0213753 A1 | 9/2011 | Manmohan | |
| 2011/0314466 A1 | 12/2011 | Berg et al. | |
| 2011/0320606 A1 | 12/2011 | Madduri et al. | |
| 2012/0066677 A1* | 3/2012 | Tang | 718/1 |
| 2012/0096134 A1* | 4/2012 | Suit | 709/221 |
| 2012/0110186 A1* | 5/2012 | Kapur et al. | 709/226 |
| 2012/0151061 A1* | 6/2012 | Bartfai-Walcott et al. | 709/226 |
| 2012/0159483 A1* | 6/2012 | He et al. | 718/1 |
| 2012/0167081 A1* | 6/2012 | Sedayao et al. | 718/1 |
| 2012/0192181 A1* | 7/2012 | Gilbert et al. | 718/1 |
| 2012/0221683 A1* | 8/2012 | Ferris | 709/218 |
| 2012/0254861 A1* | 10/2012 | Down et al. | 718/1 |
| 2012/0284709 A1* | 11/2012 | Lorenc et al. | 718/1 |
| 2012/0297238 A1* | 11/2012 | Watson et al. | 714/4.11 |
| 2012/0304191 A1* | 11/2012 | Morgan | 718/105 |
| 2012/0311568 A1* | 12/2012 | Jansen | 718/1 |
| 2013/0007216 A1* | 1/2013 | Fries et al. | 709/218 |
| 2013/0031544 A1* | 1/2013 | Sridharan et al. | 718/1 |
| 2013/0067471 A1* | 3/2013 | Kruglick | 718/1 |
| 2013/0297800 A1* | 11/2013 | Considine et al. | 709/226 |
| 2013/0346573 A1* | 12/2013 | Hemachandran et al. | 709/223 |
| 2013/0346619 A1* | 12/2013 | Panuganty et al. | 709/226 |
| 2014/0089919 A1* | 3/2014 | Melander et al. | 718/1 |
| 2014/0149591 A1* | 5/2014 | Bhattacharya et al. | 709/226 |
| 2014/0157268 A1* | 6/2014 | Gilbert et al. | 718/1 |

OTHER PUBLICATIONS

Mell et al., "The NIST Definition of Cloud Computing," Special Publication 800-145, Sep. 2011.

IBM, "Method to Create a Cloud 'Flood-Plain' for Keeping Cloud Workloads Active During Maintenance," IP.com, IPCOM000199374D, Aug. 31, 2010.

IBM, "Method and Apparatus for Relocating IT Services Across Different Hardware and Software Platforms," IP.com, IPCOM000193025D, Feb. 8, 2010.

* cited by examiner

PERFORMING MAINTENANCE OPERATIONS ON CLOUD COMPUTING NODE WITHOUT REQUIRING TO STOP ALL VIRTUAL MACHINES IN THE NODE

CROSS-REFERENCE TO RELATED APPLICATIONS

The present application is a continuation application of pending U.S. patent application Ser. No. 13/356,371, which was filed on Jan. 23, 2012, which is assigned to the assignee of the present invention. The present application claims priority benefits to U.S. patent application Ser. No. 13/356,371.

TECHNICAL FIELD

The present invention relates to cloud computing, and more particularly to performing maintenance operations on a cloud computing node without requiring to stop all the virtual machines in the node.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of physical resources of the computer. A guest operating system runs on each guest, and the guest appears to the guest operating system as a real computer. Each guest operating system may host one or more virtual machines.

Currently, when maintenance is to be performed on a cloud computing node, all of the virtual machines need to be stopped prior to the maintenance operation being performed. After the maintenance operation is performed, all of the virtual machines in the cloud computing node are restarted. Such a process is inefficient and causes operations being performed by the virtual machines to be terminated upon stopping the virtual machines, which could have an adverse affect on performance.

BRIEF SUMMARY

In one embodiment of the present invention, a method for performing maintenance operations on a cloud computing node comprises receiving an indication that a maintenance operation is to be performed on the cloud computing node. The method further comprises identifying one or more virtual machines in the cloud computing node that will be affected by the maintenance operation. Furthermore, the method comprises relocating the one or more virtual machines to one or more other cloud computing nodes prior to the maintenance operation. In addition, the method comprises performing, by a processor, the maintenance operation on the cloud computing node.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for performing maintenance operations on a cloud computing node. In one embodiment of the present invention, an administrative server receives an indication that a maintenance operation is to be performed on a cloud computing node. The administrative server identifies which virtual machine(s) on the cloud computing node will be affected by the maintenance operation. The administrative server relocates the virtual machine(s) to be affected by the maintenance operation to other suitable cloud computing node(s) prior to the maintenance operation being performed. The administrative server then performs the maintenance operation on the cloud computing node. The virtual machine(s) may be relocated back to the cloud computing node and/or relocated to other cloud computing node(s) after the maintenance operation on the cloud computing node is completed in response to a need to rebalance resources in such a manner. In this manner, maintenance operations may be performed on a cloud computing node without requiring to stop all the virtual machines in the node.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
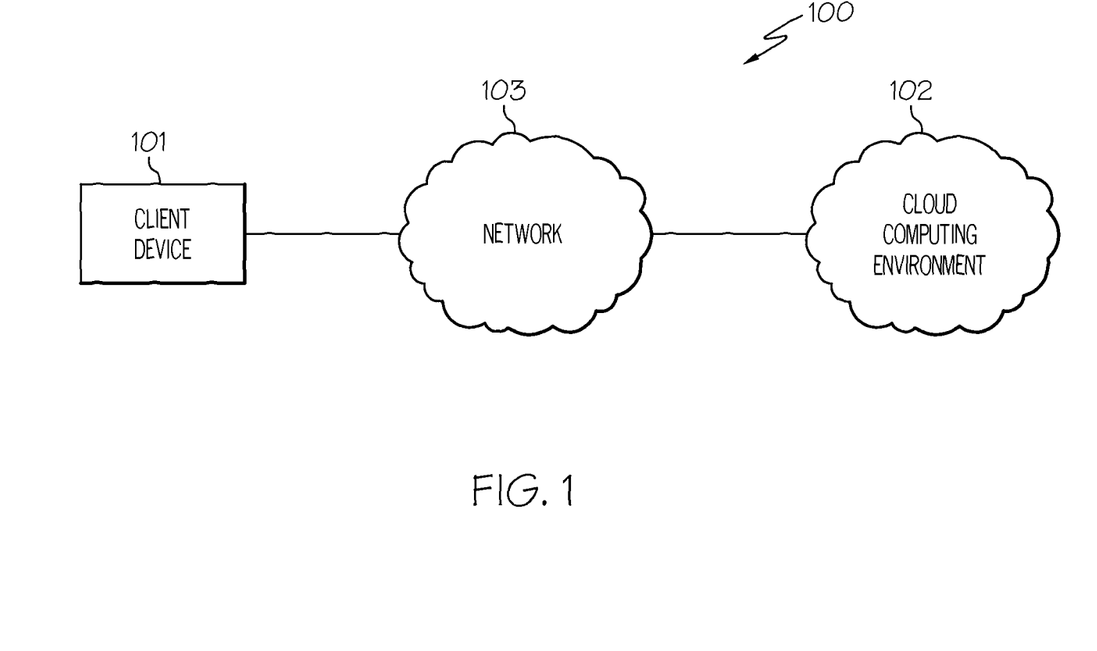
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
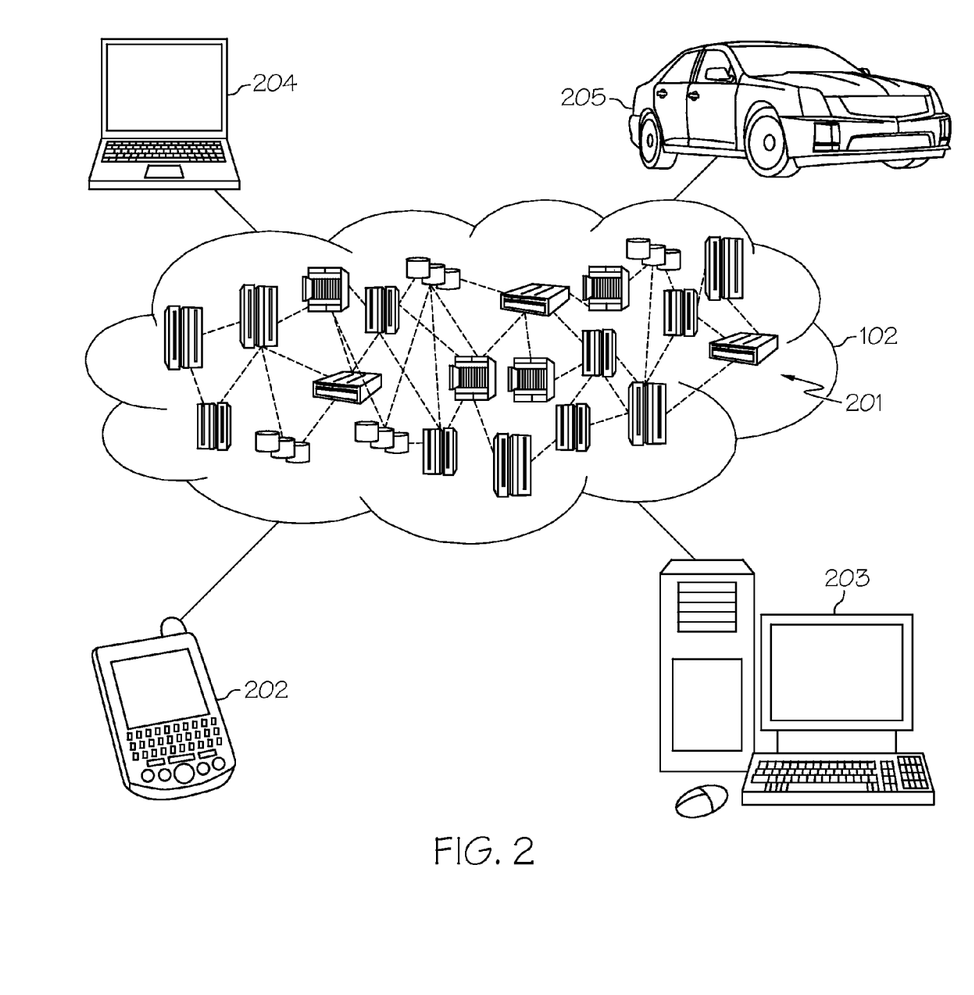
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
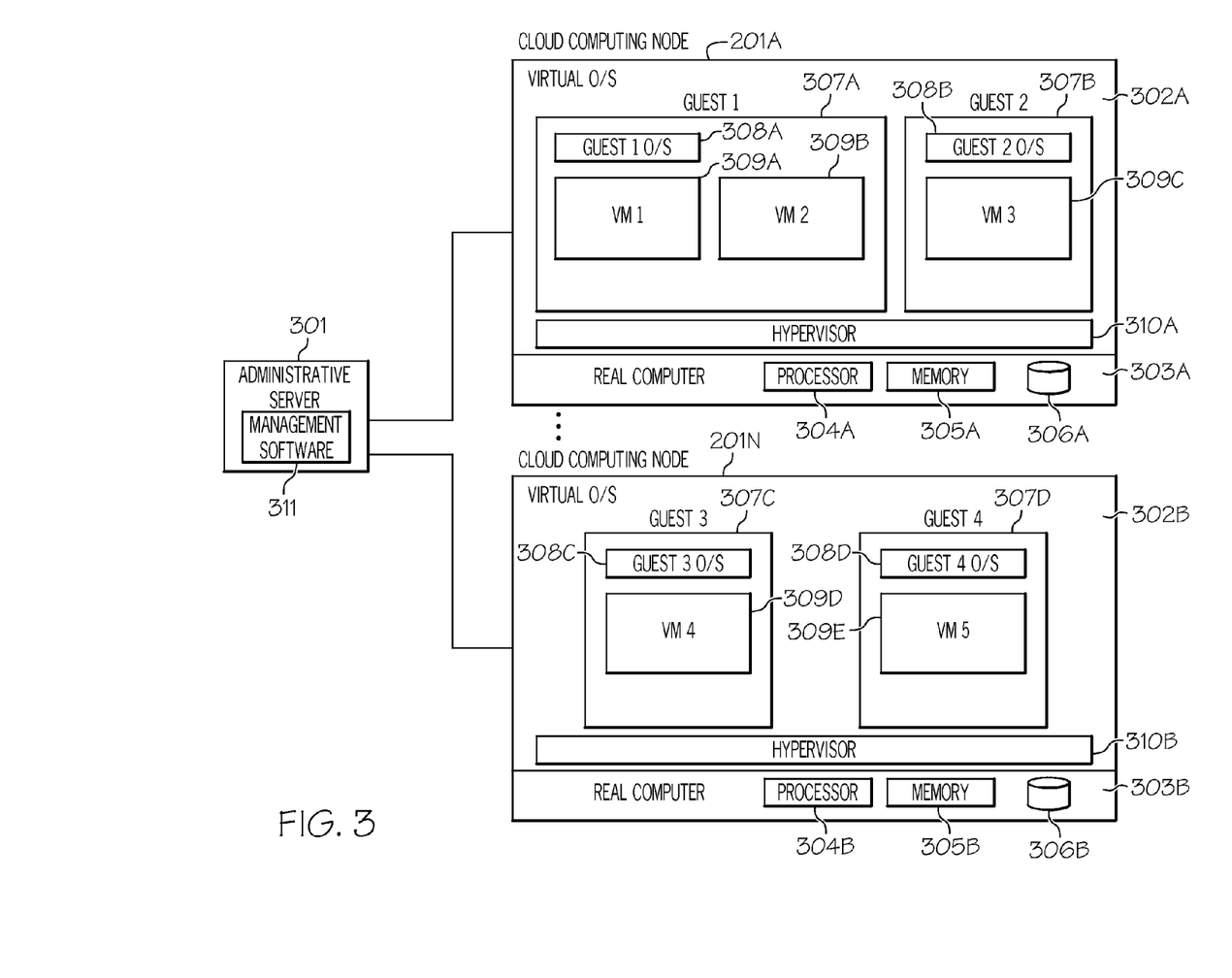
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-N are each coupled to an administrative server 301 configured to provide data center-level functions of communicating with hypervisors on cloud computing nodes 201 to install virtual machines, terminate/suspend virtual machines and relocate virtual machines from one cloud computing node 201 to another within the data center.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1 and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud networking 201A. Cloud computing node 201N includes the same elements as cloud computing node 201A. For example, guests 307C-307D (identified as "Guest 3 and Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, administrative server 301 supports a module, referred to herein as the management software 311, that can be used to manage all the hardware components of cloud computing nodes 201, monitor system utilization, intelligently deploy images of data and optimize the operations of cloud computing environment 102. Furthermore, management software 311 can be used to intelligently relocate virtual machines 309 that will be affected by a maintenance operation (e.g., updating firmware) to be performed on its cloud computing node 201 to other cloud computing nodes 201 during the maintenance operation as discussed further below. A description of the hardware configuration of administrative server 301 is provided further below in connection with FIG. 4.

Figure 4:
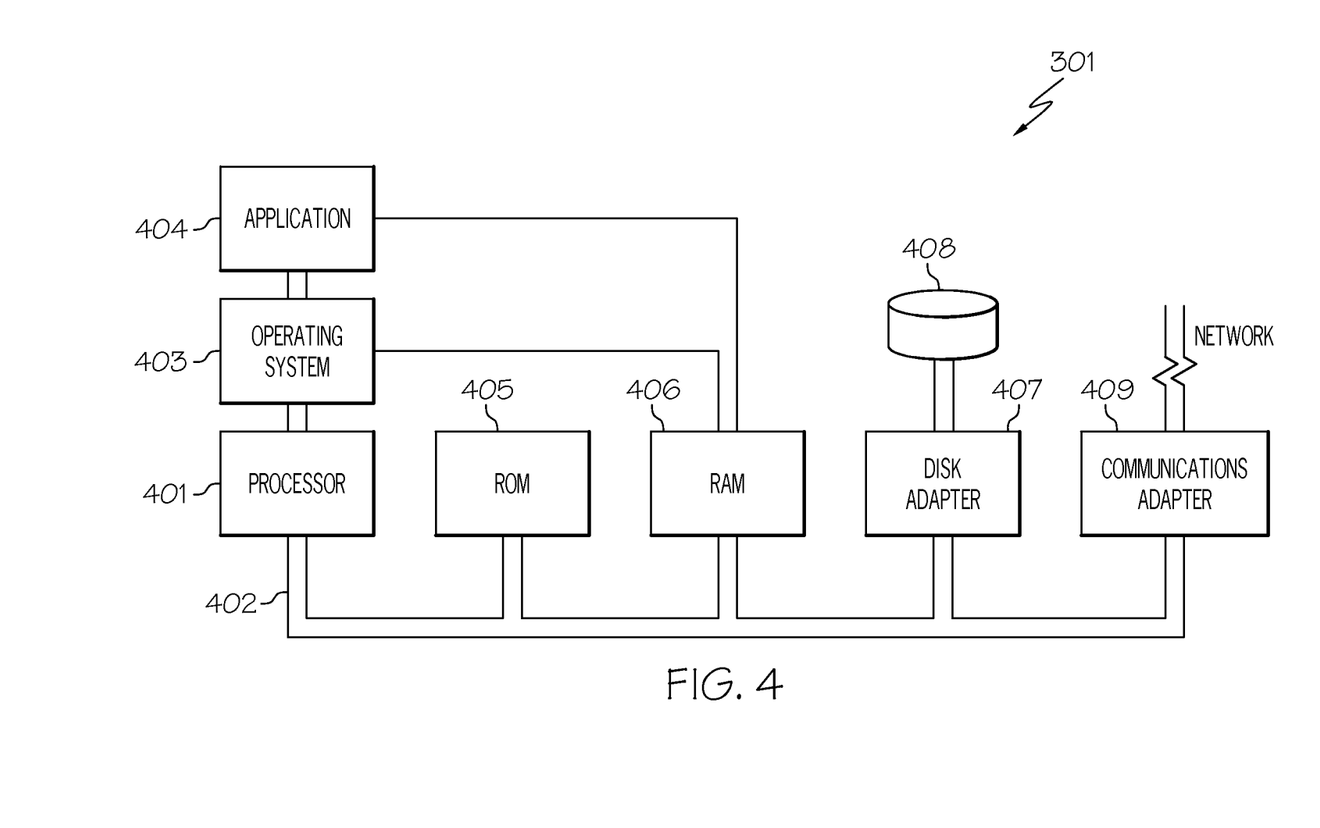
FIG. 4 illustrates a hardware configuration of an administrative server configured in accordance with an embodiment of the present invention.

Referring now to FIG. 4, FIG. 4 illustrates a hardware configuration of administrative server 301 (FIG. 4) which is representative of a hardware environment for practicing the present invention. Administrative server 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program for performing maintenance operations on a cloud computing node 201 (FIGS. 2 and 3) without requiring all of the virtual machines 309 (FIG. 3) to be stopped prior to the maintenance operation being performed as discussed further below in association with FIGS. 5A-5C.

Referring again to FIG. 4, read-only memory ("ROM") 405 is coupled to system bus 402 and includes a basic input/output system ("BIOS") that controls certain basic functions of administrative serer 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for performing maintenance operations on a cloud computing node 201 without requiring all of the virtual machines 309 to be stopped prior to the maintenance operation being performed, as discussed further below in connection with FIGS. 5A-5C, may reside in disk unit 408 or in application 404.

Administrative server 301 may further include a communications adapter 409 coupled to bus 402. Communications adapter 409 interconnects bus 402 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, when maintenance is to be performed on a cloud computing node, all of the virtual machines need to be stopped prior to the maintenance operation being performed. After the maintenance operation is performed, all of the virtual machines in the cloud computing node are restarted. Such a process is inefficient and causes operations being performed by the virtual machines to be terminated upon stopping the virtual machines, which could have an adverse affect on performance.

Figure 5A:
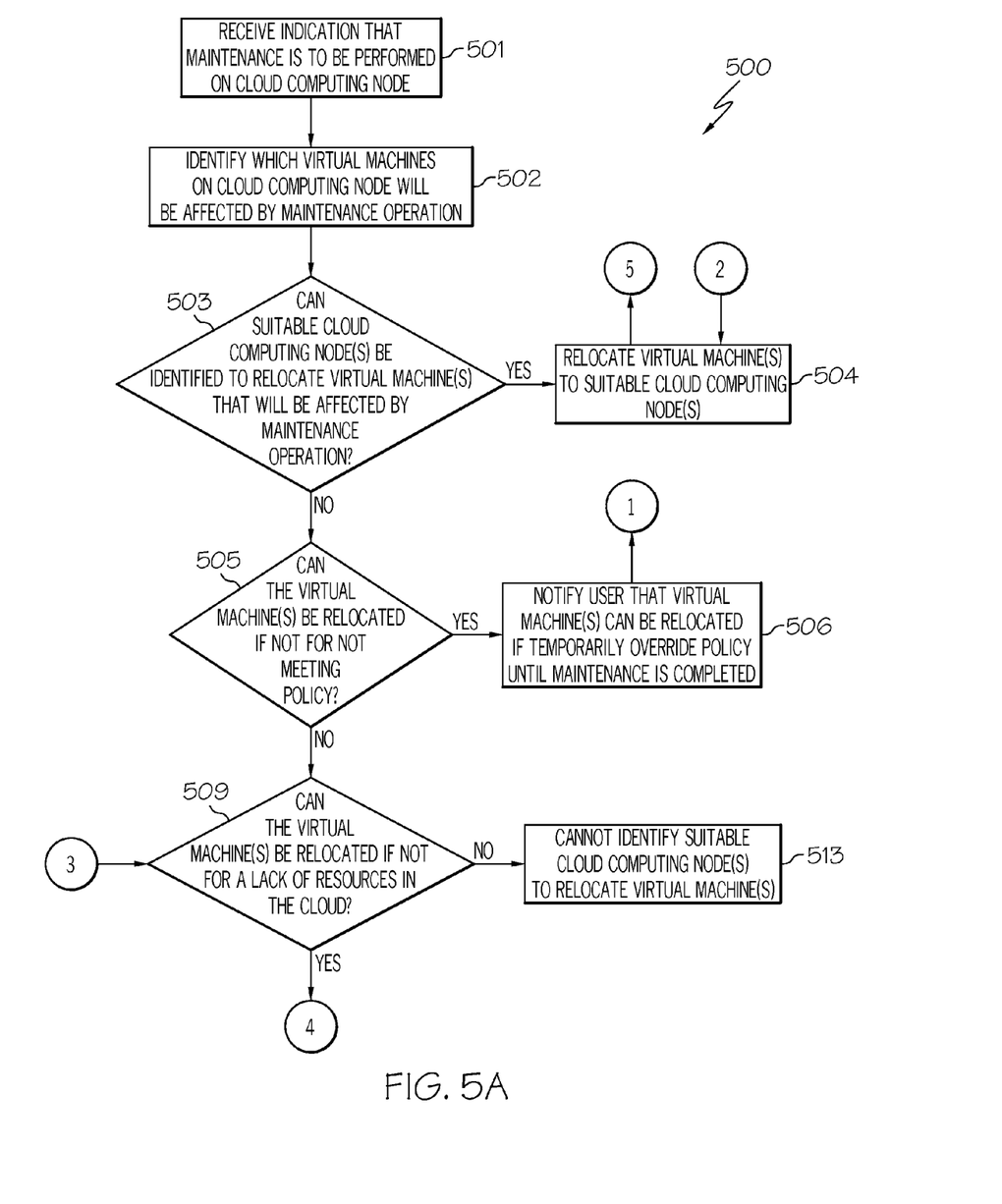
FIGS. 5A-5C are a flowchart of a method for performing maintenance operations on a cloud computing node without requiring all of the virtual machines on the cloud computing node to be stopped prior to the maintenance operation being performed in accordance with an embodiment of the present invention.
Figure 5B:
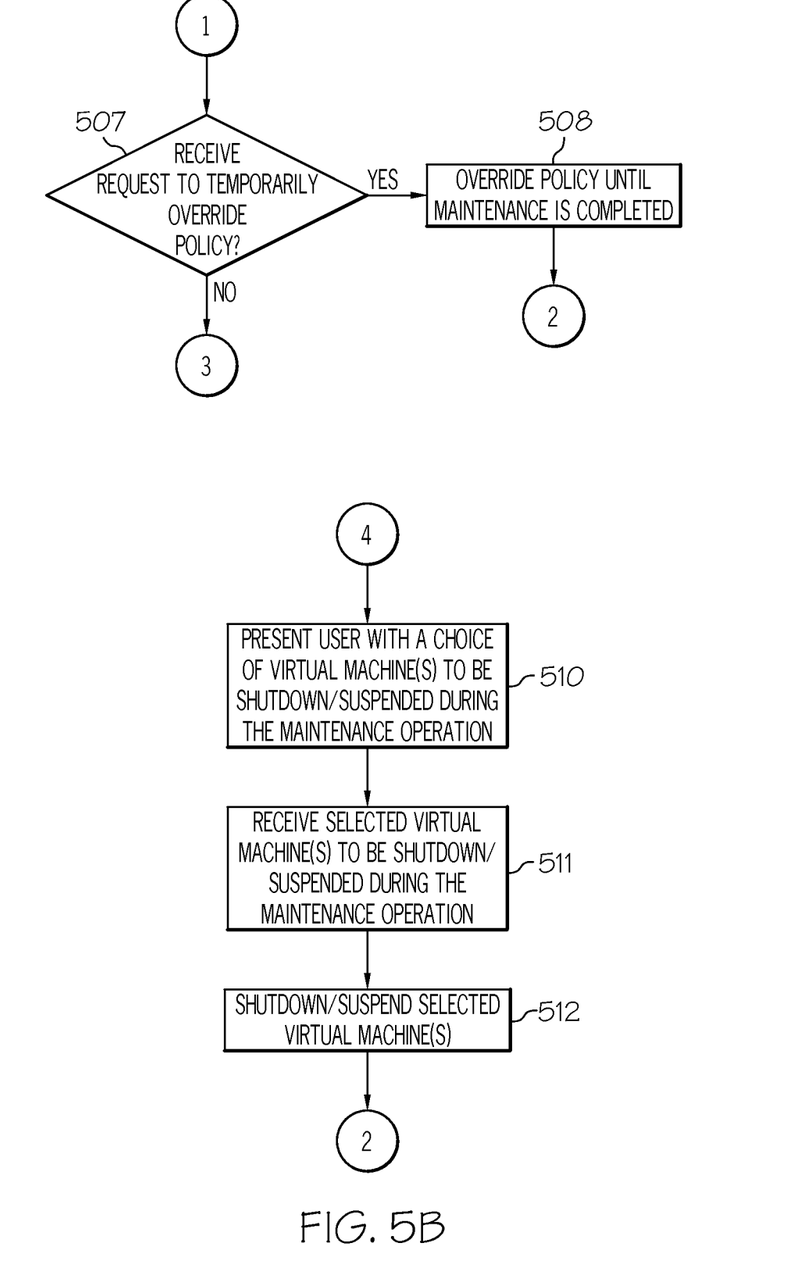
Figure 5C:
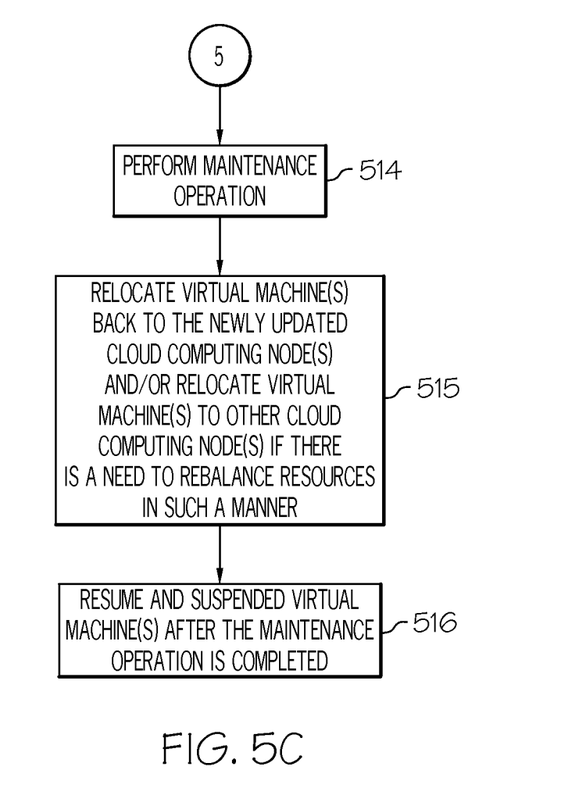

The principles of the present invention provide a more efficient process in performing maintenance operations on cloud computing nodes whereby virtual machines affected by the maintenance operation do not need to be stopped prior to the maintenance operation. Instead, the affected virtual machines can be intelligently relocated to other cloud computing nodes as discussed below in connection with FIGS. 5A-5C. FIGS. 5A-5C are a flowchart of a method 500 for performing a maintenance operation on a cloud computing node 201 (FIGS. 2 and 3) without requiring all of the virtual machines 309 (FIG. 3) to be stopped prior to the maintenance operation in accordance with an embodiment of the present invention.

Referring to FIG. 5A, in conjunction with FIGS. 1-4, in step 501, administrative server 301 receives an indication that maintenance (e.g., updating firmware) is to be performed on cloud computing node 201 (e.g., cloud computing node 201A).

In step 502, administrative server 301 identifies which virtual machines 309 (e.g., virtual machines 309A-309B) on cloud computing node 201 (e.g., cloud computing node 201A) that will be affected by the maintenance operation.

In step 503, a determination is made by administrative server 301 as to whether suitable cloud computing node(s) 201 can be identified to relocate the virtual machine(s) 309 that will be affected by the maintenance operation.

If administrative server 301 can identify suitable cloud computing node(s) 201 (e.g., cloud computing node 201N) that can be used to relocate the virtual machine(s) 309 that will be affected by the maintenance operation, then, in step 504, administrative server 301 relocates these affected virtual machine(s) 309 to the identified suitable cloud computing node(s) 201. For example, if a maintenance operation is to be performed on cloud computing node 201A and virtual machines 309A-309B will be affected by the maintenance operation, and if cloud computing node 201N is suitable to be used to relocate affected virtual machines 309A-309B, then administrative server 301 relocates virtual machines 309A-309B to cloud computing node 201N.

If, however, administrative server 301 cannot identify suitable cloud computing node(s) 201 that can be used to relocate the virtual machine(s) 309 that will be affected by the maintenance operation, then, in step 505, administrative server 301 determines whether the affected virtual machine(s) 309 could be relocated if not for not meeting a policy (system use rules). Examples of system use rules include high availability, such as to ensure a prearranged level of operational performance will be met during a contractual measurement period. High availability may also refer to ensuring that there are a particular quantity of virtual machines 309 serving as backups that are residing on a computing hardware (e.g., server) in cloud computing node 201 in close proximity to another computing hardware (e.g., server).

If the affected virtual machine(s) 309 could be relocated if not for not meeting a policy, then, in step 506, administrative server 301 notifies the user that the affected virtual machine(s) 309 could be relocated if the user temporarily overrides the policy until the maintenance operation is completed.

Referring to FIG. 5B, in conjunction with FIGS. 1-4, in step 507, a determination is made by administrative server 301 as to whether it receives a request from the user to temporarily override the policy. If administrative server 301 receives a request from the user to temporarily override the policy, then, in step 508, administrative server 301 overrides the policy until the maintenance operation is completed. Referring to FIG. 5A, after overriding the policy, administrative server 301 relocates these affected virtual machine(s) 309 to suitable cloud computing node(s) 201 in step 504.

Referring to steps 505 and 507 of FIGS. 5A and 5B, in conjunction with FIGS. 1-4, if administrative server 301 did not receive a request from the user to temporarily override the policy or if the affected virtual machine(s) 309 could not be relocated if not for not meeting a policy, then, in step 509 of FIG. 5A, administrative server 301 determines whether the affected virtual machine(s) 309 could be relocated if not for a lack of resources in cloud computing environment 102.

Referring to FIG. 5B, in conjunction with FIGS. 1-4, if administrative server 301 determines that the affected virtual machine(s) 309 could be relocated if not for a lack of resources in cloud computing environment 102, then, in step 510, administrative server 301 presents the user with a choice of virtual machine(s) 309 to be shutdown/suspended during the maintenance operation to make room for the affected virtual machine(s) 309. For example, administrative server 301 may present a list of virtual machines that are backups for meeting the high availability policy. Alternatively, or in addition, administrative server 301 may present a list of virtual machines 309 that are deemed to not be critical (e.g., do not have a high availability policy).

In step 511, administrative server 301 receives the selected virtual machine(s) 309 to be shutdown/suspended during the maintenance operation. In step 512, administrative server 301 shutdowns/suspends the selected virtual machine(s) 309. Referring to FIG. 5A, in conjunction with FIGS. 1-4, after shutting down/suspending the selected virtual machine(s) 309, administrative server 301 relocates the affected virtual machine(s) 309 (those that will be affected by the maintenance operation) to cloud computing node(s) 201 containing these virtual machine(s) 309 that were shutdown/suspended in step 504.

Referring to step 509, if the affected virtual machine(s) 309 could not be relocated if not for a lack of resources in cloud computing environment 102, then, in step 513, suitable cloud computing node(s) 201 could not be identified to relocate virtual machine(s) 309 that would be affected by the maintenance operation. For example, cloud computing node 201 of a different architecture or having a different type of hypervisor 310 may not be suitable for the affected virtual machine(s) 309. In another example, there may be suitable cloud computing nodes 201; however, they may be located in a different administration group than the one on which the affected virtual machine(s) 309 are running and therefore virtual machine(s) 309 may be not relocated to the suitable cloud computing nodes 201.

Referring to step 504, upon relocating virtual machine(s) 309 to suitable cloud computing node(s) 201, administrative server 301, in step 514 of FIG. 5C, performs the maintenance operation on cloud computing node 201 (e.g., cloud computing node 201A).

Referring to FIG. 5C, in conjunction with FIGS. 1-4, in step 515, administrative server 301 relocates virtual machine(s) 309 (those previously relocated to avoid affects of the maintenance operation) back to the newly updated cloud computing node(s) 201 and/or relocates virtual machine(s) 309 (those previously relocated to avoid affects of the maintenance operation) to other cloud computing node(s) 201 after the maintenance operation on cloud computing node 201 (e.g., cloud computing node 201A) is completed if there is a need to rebalance resources in such a manner. At times, virtual machine(s) 309 (those previously relocated to avoid affects of the maintenance operation) may not need to be relocated back to the newly updated cloud computing node 201 if there is not a need to rebalance resources in such a manner. It is noted that after the maintenance operation is completed, all virtual machines 309, including the virtual machine(s) 309 relocated to avoid the affects of the maintenance operation, may be relocated to any cloud computing node 201 in such a manner as administrative server 301 deems best in order to effectively rebalance resources.

In step 516, administrative server 301 resumes any suspended virtual machine(s) 309 after the maintenance operation is completed. That is, administrative server 301 resumes any virtual machine(s) 309 that were suspended in step 512 of FIG. 5B after the maintenance operation is completed.

In some implementations, method 500 may include other and/or additional steps that, for clarity, are not depicted. Further, in some implementations, method 500 may be executed in a different order presented and that the order presented in the discussion of FIGS. 5A-5C is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for performing maintenance operations on a cloud computing node, the method comprising:
   receiving an indication that a maintenance operation is to be performed on said cloud computing node;
   identifying one or more virtual machines in said cloud computing node that will be affected by said maintenance operation;
   relocating said one or more virtual machines to one or more other cloud computing nodes prior to said maintenance operation;
   performing, by a processor, said maintenance operation on said cloud computing node; and
   relocating one or more of said one or more virtual machines back to said cloud computing node and/or to one or more other cloud computing nodes after said maintenance operation on said cloud computing node is completed in response to a need to rebalance resources in such a manner.

2. The method as recited in claim 1 further comprising:
   notifying a user that one or more of said one or more virtual machines can be relocated if said user temporarily overrides a policy until said maintenance operation is completed.

3. The method as recited in claim 2 further comprising:
   overriding said policy until said maintenance operation is completed.

4. The method as recited in claim 1 further comprising:
   presenting a user with a choice of one or more other virtual machines to be suspended in response to one or more of said one or more virtual machines being able to be relocated if not for a lack of resources in a cloud computing environment.

5. The method as recited in claim 4 further comprising:
   receiving a selection of one or more of said one or more other virtual machines to be suspended;
   suspending said selected one or more other virtual machines until said maintenance operation is completed; and
   resuming said suspended one or more other virtual machines after said maintenance operation is completed.

6. The method as recited in claim 1 further comprising:
   presenting a user with a choice of one or more other virtual machines to be terminated in response to one or more of said one or more virtual machines being able to be relocated if not for a lack of resources in a cloud computing environment.

7. The method as recited in claim 6 further comprising:
   receiving a selection of one or more of said one or more other virtual machines to be terminated; and
   terminating operation of said selected one or more other virtual machines.

* * * * *